Nov. 18, 1924.
J. S. LEWIS
1,516,302
HAYSTACKER
Filed Jan. 16, 1922
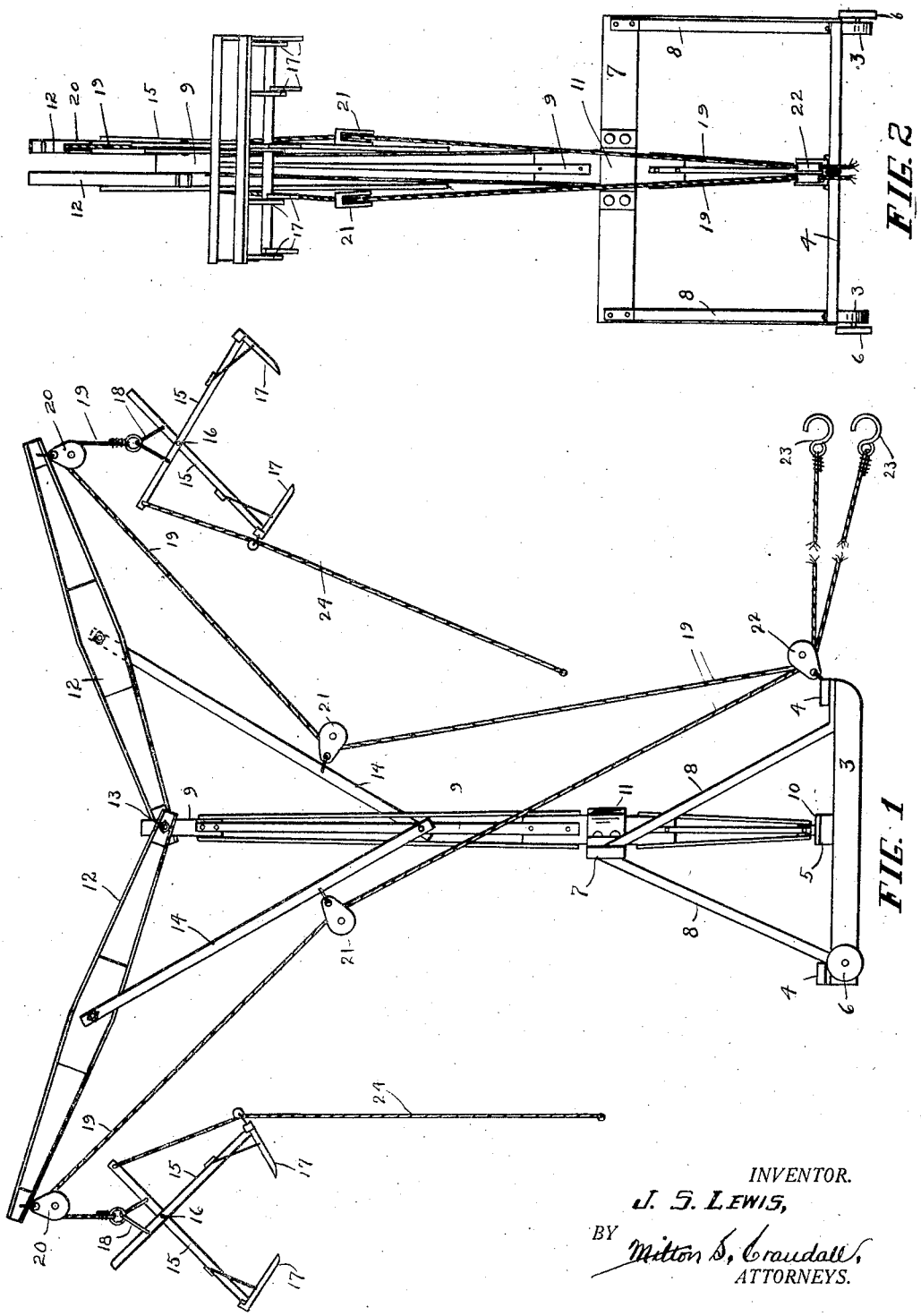
INVENTOR.
J. S. LEWIS,
BY Milton S. Crandall,
ATTORNEYS.

Patented Nov. 18, 1924.

1,516,302

UNITED STATES PATENT OFFICE.

JOSEPH S. LEWIS, OF ANTHON, IOWA.

HAYSTACKER.

Application filed January 16, 1922. Serial No. 529,648.

*To all whom it may concern:*

Be it known that I, JOSEPH S. LEWIS, a citizen of the United States, and a resident of Anthon, in the county of Woodbury and State of Iowa, have invented certain new and useful Improvements in Haystackers, of which the following is a specification.

My present invention relates to material loaders and conveyors and aims primarily to provide an improved hay-stacking device.

Another object of the invention is the production of a hay-stacking apparatus embodying improved means for lifting a cock of hay from the ground and swing them onto a stack.

These objects I successfully attain in the embodiment hereinafter described, defined in the appended claim and illustrated in the accompanying drawing which forms a part of this application and in which like characters of reference indicate corresponding parts in both views, of which:

Fig. 1 is a side elevation of a device constructed in accordance with my invention, and Fig. 2 is a front elevation of the same.

Referring to the illustrations, the device is preferably portable, being carried by a support including runners, 3, interconnected by front and rear cross-members, 4, and an intermediate cross-member, 5. The rear end portions of the runners are preferably supported by small travel-wheels, 6. The support carries an upper cross-member, 7, mounted on diagonal legs, 8, secured on the runners, 3. The said supporting frame carries a suitable upright or post, 9, having its lower end rotatably supported in a suitable bearing, 10, on the cross-member, 5, and its intermediate portion journaled in a suitable bearing, 11, on the frame-member, 7. The upper end of said post carries oppositely-disposed booms, 12, of any suitable construction, the adjacent ends of the booms being positioned on the opposite sides of the post, 9, and suitably secured thereto as by a bolt, 13. The booms are slightly inclined and on the remote sides of their intermediate portions are secured brace-bars, 14, having their lower ends secured to opposite sides of the intermediate portions of the post, 9.

From the free ends of the booms depend suitable hay-supporting forks, each preferably including a pair of crossed arms, 15, pivoted together scissors-like, as at 16, each of said arms carrying at its lower end a horizontal series of tines, 17, extending in the direction of the opposite arm. A distance above the fulcrum, 16, the extended end portions of the arms, 15, are connected by suitable linkage, 18, with ropes or other suitable flexible tractile elements, 19, which pass over pulleys, 20, on the ends of the booms, thence over guide pulleys, 21, on the braces, 14, and then through a double sheave-block, 22, secured to the center of the front frame-member, 4. The free ends of the elements, 19, may be provided with hooks, 23, or other suitable engageable members for imparting traction to the said elements, either manually or by hitching draft animals thereto.

It will now be observed that the hay-lifting fork at the left in Fig. 1 may be lowered to engage a cock of hay by slackening the rope, 19, attached thereto. Then when traction is applied to the free end of said rope the cock of hay will be elevated until the fork engages the adjacent block, 20, whereupon slight further traction on the rope rotates the post, 9, a half revolution, thus transposing the forks. The loading fork may then be opened to deposit the cock of hay on the stack, which we will assume is at the right in Fig. 1, by pulling on the fall of the rope, 24, secured to the extreme upper end of one of the arms, 15, which, it will be seen, opens the fork. The other fork may then be lowered, loaded and lifted as previously described and the post, 9, again given a half revolution in the opposite direction by a pull on the appropriate rope, 19.

It is evident that the ropes, 19, are disposed on opposite sides of the arms of the upright, 9, whereby traction on the rope associated with the rearwardly-extending boom, whichever it may be, will turn the upright, 9, and give it sufficient impetus to make a half revolution.

While I have illustrated and described the preferred embodiment I would not be understood as being limited to such specific construction, for various alterations and modifications may be made in details of construction and arrangement of parts herein disclosed without departing from the spirit and scope of the invention as defined in the appended claim.

Having thus described my invention, what

I claim as new and desire to secure by Letters Patent of the United States, is:

A derrick comprising a base, a rotatable upright, oppositely-extending booms supported from the top thereof, the booms being positioned in planes spaced from each other on either side of the upright, pulleys on the ends of the booms, cables extending over the pulleys, material carriers positioned on one end of each cable, second pulleys on the base spaced substantially from the upright, the cables being extended downwardly and around said second pulleys, the parts being so arranged that traction applied to the cable extending to the boom which extends away from the second pulleys will first cause the carrier to be drawn upwardly until it contacts with the pulley on the boom and will then cause the boom to rotate around to a position extending toward the second pulley.

In testimony whereof, I have hereunto set my hand this 7th day of January, 1922.

JOSEPH S. LEWIS.